United States Patent [19]

Hirai et al.

[11] Patent Number: 4,762,886
[45] Date of Patent: Aug. 9, 1988

[54] WEATHER RESISTANT THERMOPLASTIC RESIN COMPOSITION

[75] Inventors: Mikio Hirai; Yoshiaki Nishikubo; Tomio Yoshida, all of Niihama; Tsuneo Ochi, Ehime, all of Japan

[73] Assignee: Sumitomo Naugatick Co., Ltd., Osaka, Japan

[21] Appl. No.: 47,543

[22] Filed: May 5, 1987

[30] Foreign Application Priority Data

May 18, 1984 [JP] Japan .................................. 59-101198
Dec. 13, 1984 [JP] Japan .................................. 59-263642

[51] Int. Cl.$^4$ ...................... C08L 51/04; C08L 51/06; C08L 25/12; C08L 25/14
[52] U.S. Cl. ........................................ 525/70; 525/75; 525/76; 525/79; 525/80; 525/84; 525/85; 525/86
[58] Field of Search ...................... 525/75, 80, 84, 85, 525/70

[56] References Cited

U.S. PATENT DOCUMENTS 4,166,081  8/1979  Fournier et al. ...................... 525/75
4,419,491 12/1983  Sakano et al. ........................ 525/75

FOREIGN PATENT DOCUMENTS 58979     2/1981  Japan .................................. 525/75
57-070148 4/1982  Japan .................................. 525/75

Primary Examiner—Carman J. Seccuro
Attorney, Agent, or Firm—Jones, Tullar & Cooper

[57] ABSTRACT

A weather resistant thermoplastic resin composition which comprises (A) a graft polymer comprising (A-1) chosen from a copolymer of ethylene and propylene, a terpolymer of ethylene, propylene and a non-conjugated diene, a copolymer of ethylene and vinyl acetate, an alkyl acrylate or methacrylate polymer and a chlorinated polyethylene and (A-2) at least two kinds of monomers chosen from aromatic vinyl compounds, vinyl cyanide compounds and unsaturated carboxylic acid alkyl esters grafted thereon and (B) a terpolymer comprising styrene aromatic compounds, vinyl cyanide compounds and unsaturated carboxylic acid alkyl esters. The weight proportion of the graft polymer (A) and the terpolymer (B) is preferably from 10:90 to 90:10. In particular the amounts of styrene the vinyl cyanide compounds and the unsaturated carboxylic acid alkyl esters in the terpolymer (B) are 3 to 65% by weight, 2 to 35% by weight and 3 to 95% by weight, respectively. The result is an improved in color development, impact resistance and resistance to thermal decomposition.

4 Claims, No Drawings

WEATHER RESISTANT THERMOPLASTIC RESIN COMPOSITION

This is a continuation of co-pending application Ser. No. 732,542 filed on May 10, 1985, now abandoned.

The present invention relates to a weather resistant thermoplastic resin composition. More particularly, it relates to a weather resistant thermoplastic resin composition excellent in color development, impact resistance and resistance to thermal decomposition.

Graft polymers, which comprise a rubber material produced by the use of monomers not comprising any conjugated diene and (e.g. ethylene-propylene elastomeric polymers) and polymerizable monomers (e.g. aromatic vinyl compounds, vinyl cyanide compounds) grafted thereon, and their blend mixtures with copolymers of aromatic vinyl compounds with vinyl cyanide compounds (hereinafter referred to as "AES resin(s)") have excellent weather resistance, impact resistance, chemical resistance, etc. and are used in various fields. These resins, however, have such disadvantages that they are poor in color development and difficultly colored with bright colors.

In order to obviate these disadvantages, it has been proposed to incorporate polymethyl methacrylate (PMMA) into AES resins (cf. Japanese Patent Publns. (unexamined) Nos. 117557/82 and 139139/82). However, the resulting AES resin compositions incorporated with PMMA are inferior to AES resins themselves in their inherent impact strength and thermally decomposed with ease on pelletizing and/or molding.

As a result of an extensive study, it has now been found that incorporation of a certain specific terpolymer into an AES resin produces great improvements in color development, impact resistance and resistance to thermal decomposition. This invention is based on the above finding.

According to the present invention, there is provided a weather-resistant thermoplastic resin composition which comprises 10 to 90% by weight of (A) a graft polymer comprising (A-1) a non-conjugated diene rubber and (A-2) at least two kinds of monomers chosen from aromatic vinyl compounds, vinyl cyanide compounds and unsaturated carboxylic acid alkyl esters grafted thereon and 90 to 10% by weight of (B) a terpolymer comprising aromatic vinyl compounds, vinyl cyanide compounds and unsaturated carboxylic acid alkyl esters. In addition to good weather resistance, this resin composition shows high color development and impact resistance and also low thermal decomposition.

Particularly when the component (A) is a graft polymer wherein at least one aromatic vinyl compound and at least one vinyl cyanide compound as the component (A-2) are grafted on a rubber as the component (A-1) and the component (B) is a terpolymer comprising one or more aromatic vinyl compounds, one or more vinyl cyanide compounds and one or more unsaturated carboxylic acid alkyl esters in a weight proportion of 3–65, 2–35 and 20–95, the resin composition shows excellent weather resistance, color development, impact resistance and resistance to thermal decomposition.

The resin composition of the invention comprises two essential components, i.e. a graft polymer as the component (A) and a terpolymer as the component (B).

The graft polymer (A) comprises a non-conjugated diene rubber (A-1) and at least two kinds of monomers (A-2) grafted thereon, said monomers being chosen from aromatic vinyl compounds, vinyl cyanide compounds and unsaturated carboxylic acid alkyl esters.

The rubber may be a rubber material produced by the use of monomers not comprising any conjugated diene, for example (A-1) (A-1) may be a copolymer of ethylene and propylene (EPR), a terpolymer of ethylene, propylene and a non-conjugated diene (e.g. dicyclopenta-diene, ethylidene-norbornene), a copolymer of ethylene and vinyl acetate, an alkyl acrylate or methacrylate polymer such as polybutyl acrylate, chlorinated polyethylene, etc. These may be used solely or in combination. Preferred are ethylene/propylene copolymer and ethylene/propylene/non-conjugated diene terpolymer.

The monomers (A-2) to be grafted onto the rubber are at least two kinds of monomers chosen from aromatic vinyl compounds, vinyl cyanide compounds and unsaturated carboxylic acid alkyl esters. Preferred is the combined use of at least one aromatic vinyl compound with at least one vinyl cyanide compound and/or at least one unsaturated carboxylic acid alkyl ester, especially the combined use of at least one aromatic vinyl compound with at least one vinyl cyanide compound.

Examples of the aromatic vinyl compound are styrene, α-methylstyrene, dimethylstyrene, vinyltoluene, etc. Among them, styrene is the most preferred. Examples of the vinyl cyanide compounds are acrylonitrile, methacrylonitrile, etc. Preferred is acrylonitrile. Examples of the unsaturated carboxylic acid alkyl esters are methyl acrylate, ethyl acrylate, butyl acrylate, methyl methacrylate, ethyl methacrylate, butyl methacrylate, hydroxyethyl acrylate, hydroxyethyl methacrylate, hydroxypropyl methacrylate, etc. Preferred is the combined use of styrene with acrylonitrile and/or methyl methacrylate, particularly the combined use of styrene with acrylonitrile.

While there is no specific limitation to the weight proportion of the rubber (A-1) and the monomers (A-2), it may preferably be from 10:90 to 80:20. Likewise, the weight proportion of the aromatic vinyl compounds, the vinyl cyanide compounds and the unsaturated carboxylic acid alkyl esters is not limitative. Preferably, the weight ratio of the aromatic vinyl compounds and the vinyl cyanide compounds and/or the unsaturated carboxylic acid alkyl esters may be from 50:50 to 80:20. In case of the monomers (A-2) being styrene, acrylonitrile and methyl methacrylate, the weight ratio of styrene and acrylonitrile and/or methyl methacrylate may be preferably from 50:50 to 80:20.

Production of the graft polymer (A) by graft polymerization of the monomers (A-2) onto the rubber (A-1) may be accomplished by conventional procedures such as emulsion polymerization, suspension polymerization, solution polymerization and bulk polymerization.

The terpolymer (B) comprises aromatic vinyl compounds, vinyl cyanide compounds and unsaturated carboxylic alkyl esters. The use of these three kinds of monomers is essential in this invention. In other words, the copolymer obtained by polymerization of two kinds of monomers chosen from them can not achieve the sufficient improvement of the physical properties, i.e. color development, impact resistance, thermal decomposition and weather resistance, at which the invention aims. Examples of the aromatic vinyl compounds are styrene, α-methylstyrene, dimethylstyrene, vinyltoluene, etc. Among them, preferred is styrene. As the vinyl cyanide compounds, there may be exemplified acrylonitrile, methacrylonitrile, etc. Acrylonitrile is favorably used. Examples of the unsaturated carboxylic alkyl esters are methyl acrylate, ethyl acrylate, butyl acrylate, methyl methacrylate, ethyl methacrylate, butyl methacrylate, hydroxyethyl acrylate, hydroxyethyl methacrylate, hydroxypropyl methacrylate, etc. Among them, methyl methacrylate is preferable.

The weight percents of the aromatic vinyl compounds, the vinyl cyanide compounds and the unsaturated carboxylic acid alkyl esters in the terpolymer (B) may be usually 3–65% by weight, 2–35% by weight and 3–95% by weight, respectively. When the respective proportion of these compounds is outside this range, significant improvement in color development as well as resistance to thermal decomposition can be hardly attained. While any limitation is not present on the intrinsic viscosity of the terpolymer (B), it is preferred to be from 0.3 to 1.5 (determined in dimethylformamide at 30° C.) from the viewpoints of impact resistance, processability, etc.

Production of the terpolymer (B) by polymerization of said three kinds of monomers may be accomplished by conventional polymerization procedures such as emulsion polymerization, bulk polymerization, solution polymerization, bulk-suspension polymerization and suspension polymerization.

In the composition of the invention, the weight proportion of the graft polymer (A) and the terpolymer (B) is normally from 10:90 to 90:10. When the amount of the graft polymer (A) is smaller than the lower limit, the impact resistance of the resulting composition is not satisfactory. When the graft polymer (A) is larger than the upper limit, the resultant composition is apt to show inferior color development and processability.

In addition to the graft polymer (A) and the terpolymer (B) as the essential components, the composition of the invention may comprise, when desired, any additive(s) such as dyestuffs, pigments, stabilizers, plasticizers, antistatic agents, ultraviolet absorbers, lubricants and fillers as the optional components.

Mixing of said essential components and, when used, said optional components may be accomplished by the use of a conventional mixing apparatus such as a Banbury mixer or an extruder.

The thus obtained composition may be molded in an appropriate shape by any conventional molding procedure such as extrusion molding or injection molding.

Practical and presently preferred embodiments of the invention will be illustratively shown in the following Examples wherein part(s) and % are by weight, unless otherwise indicated.

The graft polymer (A), the terpolymer (B), the copolymer (b) and polymethyl methacrylate (PMMA) as used were prepared or obtained in the manner as shown below.

Graft polymer (A):

EPDM comprising ethylidene-norbornene as the diene monomer (iodine value, 8.0; Mooney viscosity, 61; propylene content, 43%) (310 parts) was dissolved in a mixed solvent of n-hexane (3000 parts) and ethylene chloride (1500 parts), and styrene (290 parts), acrylonitrile (150 parts) and benzoyl peroxide (13 parts) were added thereto. Polymerization was carried out at 67° C. in nitrogen atmosphere for 10 hours. The reaction mixture was contacted with large excess of methanol. The precipitate was collected and dried to give a graft polymer (A).

Terpolymer (B) and copolymer (b):

To a monomeric mixture as shown in Table 1 (100 parts), t-dodecylmercaptan (0.1 part) as the molecular weight regulating agent and benzoyl peroxide (0.3 part) as the initiator were added, and the resultant mixture was subjected to suspension polymerization using polyvinyl alcohol as the suspending agent at 80° C. for 8 hours according to a per se conventional procedure. By removal of water from the reaction mixture, there was obtained a terpolymer (B).

In the same manner as above, there was produced a copolymer (b) for comparison.

TABLE 1

|  | Styrene | α-Methyl-styrene | Acrylonitrile | Methyl methacrylate |
|---|---|---|---|---|
| Terpolymer |  |  |  |  |
| B-1 | 40 | — | 40 | 20 |
| B-2 | 75 | — | 5 | 20 |
| B-3 | 20 | — | 10 | 70 |
| B-4 | 20 | — | 30 | 50 |
| B-5 | 40 | — | 10 | 50 |
| B-6 | 40 | — | 30 | 30 |
| B-7 | — | 40 | 10 | 50 |
| B-8 | 10 | — | 10 | 80 |
| B-9 | 10 | — | 30 | 60 |
| B-10 | 30 | — | 10 | 60 |
| B-11 | 20 | — | 60 | 20 |
| B-12 | 70 | — | 10 | 20 |
| Copolymer |  |  |  |  |
| b-1 | 70 | — | — | 30 |
| b-2 | 70 | — | 30 | — |
| b-3 | 30 | — | — | 70 |

Polymethyl methacrylate (PMMA):

As polymethyl methacrylate for comparison, there was used commercially available polymethyl methacrylate ("Sumipex B-LG" manufactured by Sumitomo Chemical Company, Limited).

EXAMPLES 1 AND 2 AND COMPARATIVE EXAMPLES 1 TO 5

Preparation of the resin composition:

The graft polymer (A) and the terpolymer (B), the copolymer (b) or PMMA were mixed together in a weight proportion as shown in Table 2 with the following dyestuff or pigment by the aid of a Banbury mixer at 200° C. for 4 minutes to obtain a resin composition:

| Dyestuff or pigment |  | Parts(s)* |
|---|---|---|
| Red: | Chromophthal red | 0.2 |
| Blue: | Ultramarine #2000 | 0.2 |
| Black: | Carbon #45 | 0.9 |

Note:
*Based on 100 parts of the combined amount of the graft polymer (A) and the terpolymer (B), the copolymer (b) or PMMA.

The resultant resin composition was molded by the use of an injection molding machine (7 oz/shot capacity; manufactured by Japan Steel Works, Ltd.; molding temperature; 230° C.) to obtain a test piece.

In the same manner as above but using commercially available ABS resin ("Kralastic MH" manufactured by Sumitomo Naugatuck Co., Ltd.), the standard piece for color development was prepared.

Observation was made on color development of the test pieces. Also, measurement was made on thermal decomposition, impact strength and weather resistance of the test pieces colored in black.

The results are shown in Table 2.

TABLE 2

|  | Example | | Comparative Example | | | | |
| --- | --- | --- | --- | --- | --- | --- | --- |
|  | 1 | 2 | 1 | 2 | 3 | 4 | 5 |
| Graft polymer (A) (part(s)) | 50 | 50 | 50 | 50 | 50 | 50 | 50 |
| Terpolymer (part(s)) | | | | | | | |
| (B-1) | 50 | — | — | — | — | — | — |
| (B-2) | — | 50 | — | — | — | — | — |
| Copolymer (part(s)) | | | | | | | |
| (b-1) | — | — | 50 | — | — | — | 35 |
| (b-2) | — | — | — | 50 | — | 40 | 15 |
| PMMA (part(s)) | — | — | — | — | 50 | 10 | — |
| (Methyl methacrylate content in the composition (%)) | (10) | (10) | (15) | (0) | (50) | (10) | (10.5) |
| Color development | | | | | | | |
| Red ($\Delta E$)*1 | 2.9 | 2.8 | 4.9 | 6.8 | 0.9 | 3.1 | 6.5 |
| Blue ($\Delta E$)*1 | 3.2 | 3.0 | 5.1 | 7.1 | 1.2 | 3.5 | 6.7 |
| Black (depth, visual color judgement) | Good | Good | Not good | Not good | Good | Not good | Not good |
| Resistance to thermal decomposition (%)*2 | | | | | | | |
| 30 minutes | 0.5 | 0.5 | 0.8 | 0.6 | 12.9 | 1.2 | 0.8 |
| 120 minutes | 0.8 | 0.7 | 1.0 | 1.8 | 41.2 | 4.8 | 1.1 |
| Impact resistance (kg/cm/cm)*3 | 38.5 | 36.8 | 21.6 | 38.9 | 20.5 | 31.2 | 27.4 |
| Weather resistance (%)*4 | 87 | 88 | 83 | 80 | 87 | 85 | 83 |

Note:
*1 Color difference in comparison with the standard piece of ABS resin.
*2 Weight loss (%) after being allowed to stand in an oven of 250° C.
*3 Izod impact resistance, ¼", notched, 23° C.
*4 Retention of impact strength (⅛", not notched, −10° C.) after 1000 hours exposure to weather-o-meter (%).

From the above results, it is seen that the resin composition comprising the graft polymer (A) with the copolymer (b-1) or PMMA (Comparative Examples 1 and 3) is much inferior to the resin composition comprising the graft polymer (A) with the terpolymer (B) (Examples 1 and 2) in impact resistance. The resin composition comprising the graft polymer (A) with the copolymer (b-1) (Comparative Example 3) is also inferior in resistance to thermal decomposition. The resin composition comprising the graft polymer (A) with the copolymer (b-2) (Comparative Example 2) is markedly inferior in color development.

In the resin composition comprising the copolymer (b) (Comparative Examples 4 and 5), the methyl methacrylate content was the same level as that (about 10%) in the composition of the invention (Examples 1 and 2) but no sufficient improvement was observed in any of the physical properties as observed or measured.

Accordingly, it may be said that the composition of the graft polymer (A) incorporated with the terpolymer (B) according to the invention shows good color development, heat resistance and impact resistance in comparison with that incorporated with the copolymer (b) or PMMA.

EXAMPLES 3 L TO 13 AND COMPARATIVE EXAMPLES 6 TO 12

Preparation of the resin composition:

The graft polymer (A) and the terpolymer (B), the copolymer (b) and/or PMMA were mixed together in a weight proportion of 50:50 with the following dyestuff or pigment by the aid of a Banbury mixer at 200° C. for 4 minutes to obtain a resin composition:

| Dyestuff or pigment | | Parts(s)* |
| --- | --- | --- |
| Red: | Chromophthal red | 0.2 |
| Blue: | Ultramarine #2000 | 0.2 |
| Black: | Carbon #45 | 0.9 |

Note:
*Based on 100 parts of the combined amount of the graft polymer (A) and the terpolymer (B), the copolymer (b) or PMMA.

The resultant resin composition was molded by the use of an injection molding machine (7 oz/shot capacity; manufactured by Japan Steel Works, Ltd.; molding temperature; 230° C.) to obtain a test piece.

In the same manner as above but using commercially available ABS resin ("Kralastic MH" manufactured by Sumitomo Naugatuck Co., Ltd.), the standard piece for color development was prepared.

Observation was made on color development of the test pieces. Also, measurement was made on resistance to thermal decomposition, impact strength and weather resistance of the test pieces colored in black.

The results are shown in Table 3.

TABLE 3

|  | Example | | | | | | | | | | |
| --- | --- | --- | --- | --- | --- | --- | --- | --- | --- | --- | --- |
|  | 3 | 4 | 5 | 6 | 7 | 8 | 9 | 10 | 11 | 12 | 13 |
| Kind of terpolymer (B) or copolymer (b) and/or PMMA (weight ratio) | B-3 | B-4 | B-5 | B-6 | B-7 | B-8 | B-9 | B-10 | B-11 | B-1 | B-12 |
| Methyl methacrylate content in the composition (%) | (35) | (25) | (25) | (15) | (25) | (40) | (30) | (30) | (10) | (10) | (10) |
| Color development | | | | | | | | | | | |
| Red ($\Delta E$)*1 | 0.2 | 0.3 | 0.7 | 1.3 | 0.6 | 0.2 | 0.3 | 0.5 | 3.1 | 2.9 | 2.8 |
| Blue ($\Delta E$)*1 | 0.3 | 0.4 | 0.9 | 1.5 | 0.8 | 0.2 | 0.3 | 0.7 | 3.5 | 3.2 | 3.0 |
| Black (depth, visual color judgement) | Good | Good | Good | Good | Good | Good | Good | Good | Good | Good | Good |

TABLE 3-continued

| Resistance to thermal decomposition (%)*2 | | | | | | | | | | | |
|---|---|---|---|---|---|---|---|---|---|---|---|
| 30 minutes | 0.5 | 0.5 | 0.5 | 0.6 | 0.5 | 0.7 | 0.6 | 0.6 | 0.6 | 0.5 | 0.6 |
| 120 minutes | 0.7 | 0.8 | 0.8 | 0.8 | 0.7 | 0.9 | 0.8 | 0.7 | 0.8 | 0.8 | 0.8 |
| Impact resistance (kg/cm/cm)*3 | 35.7 | 39.8 | 36.0 | 38.8 | 32.7 | 33.4 | 37.9 | 36.2 | 23.2 | 38.5 | 28.9 |
| Weather resistance (%)*4 | 88 | 87 | 87 | 87 | 86 | 85 | 87 | 88 | 83 | 87 | 87 |

| | | Comparative Example | | | | | | |
|---|---|---|---|---|---|---|---|---|
| | | 6 | 7 | 8 | 9 | 10 | 11 | 12 |
| Kind of terpolymer (B) or copolymer (b) and/or PMMA (weight ratio) | | b-2/PMMA (1:1) | b-1 | b-2 | b-3 | PMMA | b-2/b-3 (3:7) | PMMA/b-2 (7:3) |
| Methyl methacrylate content in the composition (%) | | (25) | (15) | (0) | (35) | (50) | (24.5) | (35) |
| Color development | | | | | | | | |
| Red (ΔE)*1 | | 3.2 | 4.9 | 6.8 | 2.5 | 0.9 | 3.5 | 0.5 |
| Blue (ΔE)*1 | | 3.6 | 5.1 | 7.1 | 2.8 | 1.2 | 3.8 | 0.7 |
| Black (depth, visual color judgement) | | Good | Not good | Not good | Good | Good | Good | Good |
| Resistance to thermal decomposition (%)*2 | | | | | | | | |
| 30 minutes | | 6.5 | 0.8 | 0.6 | 0.9 | 12.9 | 0.8 | 8.2 |
| 120 minutes | | 20.6 | 1.0 | 1.8 | 1.2 | 41.2 | 1.0 | 29.6 |
| Impact resistance (kg/cm/cm)*3 | | 28.7 | 21.6 | 38.9 | 20.5 | 20.5 | 24.2 | 23.8 |
| Weather resistance (%)*4 | | 84 | 83 | 80 | 86 | 87 | 86 | 88 |

Note:
*1Color difference between the standard ABS resin sample and the test sample.
*2Weight loss (%) after being allowed to stand in an oven of 250° C.
*3⅛", notched, 23° C.
*4Retention of impact strength (⅛", not notched, −10° C.) after 1000 hours exposure to weather-o-meter (%).

We claim:

1. A weather resistant thermoplastic resin composition which comprises (A) a graft polymer coprising a rubber (A-1) produced by the use of monomers not comprising any conjugated diene, said rubber (A-1) being chosen from a copolymer of ethylene and propylene, a terpolymer of ethylene, propylene and a non-conjugated diene, a copolymer of ethylene and vinyl acetate, an alkyl acrylate or methacrylate polymer and a chlorinated polyethylene and (A-2) at least two kinds of monomers chosen from aromatic vinyl compounds, vinyl cyanide compounds and unsaturated carboxylic acid alkyl esters grafted thereon and (B) a terpolymer consisting of unsubstituted styrene, vinyl cyanide compounds and unsaturated carboxylic acid alkyl esters, the weight proportion of the graft polymer (A) and the terpolymer (B) being from 10:90 to 90:10, wherein the amounts of styrene, the vinyl cyanide compounds and the unsaturated carboxylic acid alkyl esters in the terpolymer (B) are defined to be 3 to 65% by weight, 2 to 35% by weight and 3 to 95% by weight, respectively.

2. The resin composition according to claim 1, wherein the weight proportion of the rubber (A-1) and the monomers (A-2) in the graft polymer (A) is from 10:90 to 80:20.

3. The resin composition according to claim 2, wherein the weight proportion of the aromatic vinyl compounds and the vinyl cyanide compounds or the unsaturated carboxylic acid alkyl esters is from 50:50 to 80:20.

4. The resin composition according to claim 2, wherein the weight proportion of the aromatic vinyl compounds and the combination of the vinyl cyanide compounds and the unsaturated carboxylic acidalkyl esters is from 50:50 to 80:20.

* * * * *